United States Patent [19]

Long et al.

[11] Patent Number: 5,117,354
[45] Date of Patent: May 26, 1992

[54] AUTOMATED SYSTEM FOR PRICING AND ORDERING CUSTOM MANUFACTURED PARTS

[75] Inventors: Gary R. Long, Cross Plains; Charles W. Callender, Oregon, both of Wis.

[73] Assignee: Carnes Company, Inc., Verona, Wis.

[21] Appl. No.: 533,567

[22] Filed: Jun. 5, 1990

Related U.S. Application Data

[62] Division of Ser. No. 198,196, May 24, 1988, abandoned.

[51] Int. Cl.$^5$ ............................................. G06F 15/21
[52] U.S. Cl. ..................................... 364/401; 364/408
[58] Field of Search ....................... 364/401, 403, 408; 379/96

[56] References Cited

U.S. PATENT DOCUMENTS

| | | | |
|---|---|---|---|
| 4,128,758 | 12/1978 | Bukowski et al. | 235/433 |
| 4,438,326 | 3/1984 | Uchida | 235/379 |
| 4,466,001 | 8/1984 | Moore et al. | 340/825.08 |
| 4,468,750 | 8/1984 | Chamoff et al. | 364/900 |
| 4,503,503 | 3/1985 | Suzuki | 364/900 |
| 4,511,970 | 4/1985 | Okano et al. | 364/401 |
| 4,530,067 | 7/1985 | Dorr | 364/900 |
| 4,578,768 | 3/1986 | Racine | 364/560 |
| 4,584,648 | 4/1986 | Dlugos | 364/464 |
| 4,645,238 | 2/1987 | Vincent et al. | 283/67 |
| 4,674,044 | 6/1987 | Kalmus et al. | 364/408 |
| 4,695,880 | 9/1987 | Johnson et al. | 358/86 |
| 4,760,528 | 7/1988 | Levin | 364/419 |
| 4,799,156 | 1/1989 | Shavit et al. | 364/401 |
| 4,805,207 | 2/1989 | McNutt et al. | 379/89 |
| 4,887,208 | 12/1989 | Scheider et al. | 364/403 |
| 4,899,292 | 2/1990 | Montagna et al. | 364/521 |

FOREIGN PATENT DOCUMENTS

0012068 1/1988 Japan.

OTHER PUBLICATIONS

"Electronic Mail", *Commutation & Transmission*, No. 5, 1982, pp. 21-30.
*Acura Integra: Service Manual 1987*, Honda Motor Co., Ltd., pp. (1-2).
*PTS New Product Announcements*, dateline: Grand Rapids, Mich., Aug. 26, 1987, "Quik.Quote".
*PTS New Product Announcements*, dateline: Dearborn, Mich., Mar. 8, 1988, "New Quik Quote Cost Estimating . . .".

*Primary Examiner*—Dale M. Shaw
*Assistant Examiner*—David Huntley
*Attorney, Agent, or Firm*—Quarles & Brady

[57] ABSTRACT

A system is disclosed for the automated pricing and ordering of custom manufactured parts, as for the air handling equipment industry. The system includes software for personal computers of the sales representatives which assists the sales representative in creating product identification codes which specify the specifications of the product to be made. A completed order of such items is deposited in an electronic mail system addressed to the manufacturer. A host computer at the manufacturer periodically polls the electronic mail system for communications and then either prices the quote or processes the order.

7 Claims, 7 Drawing Sheets

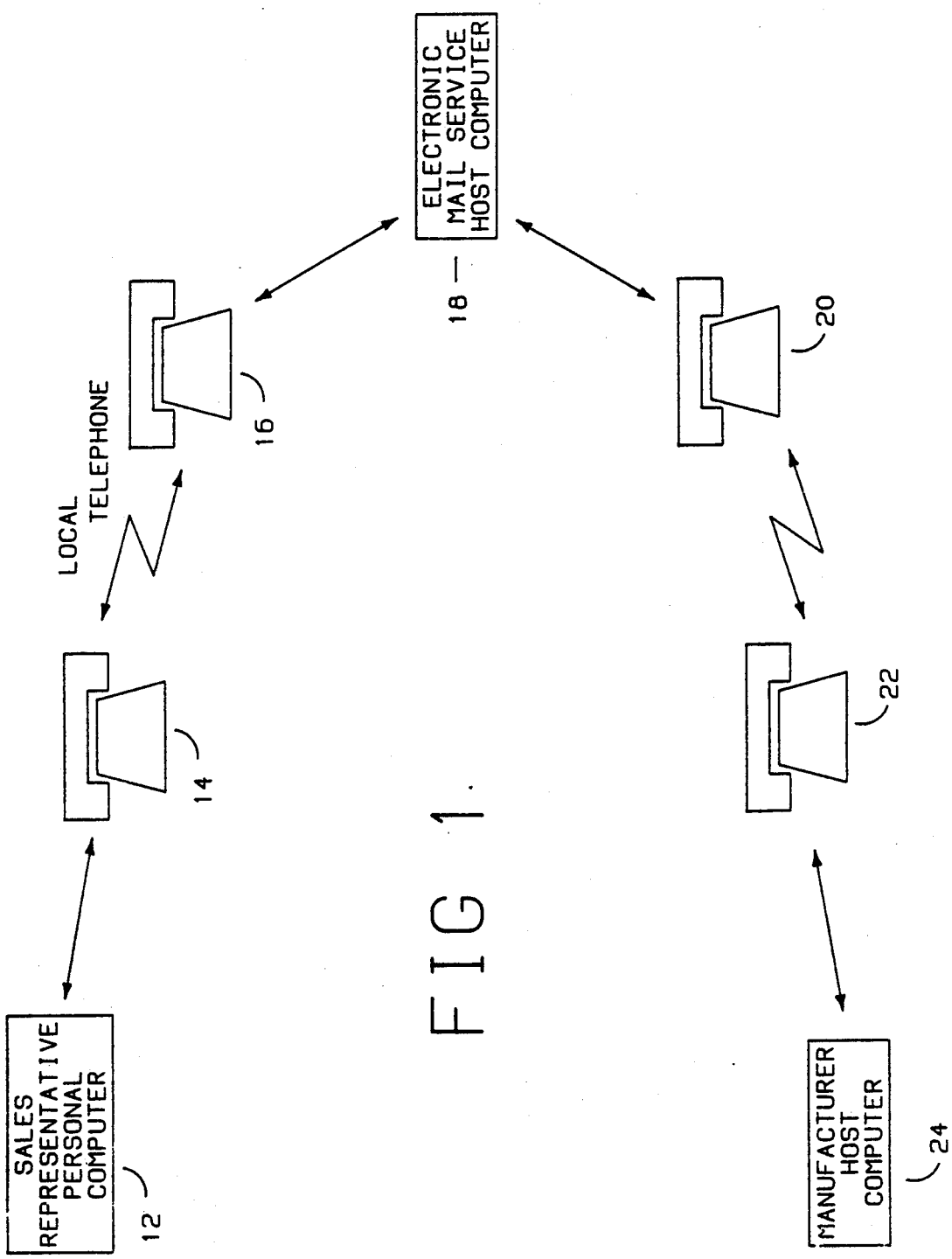

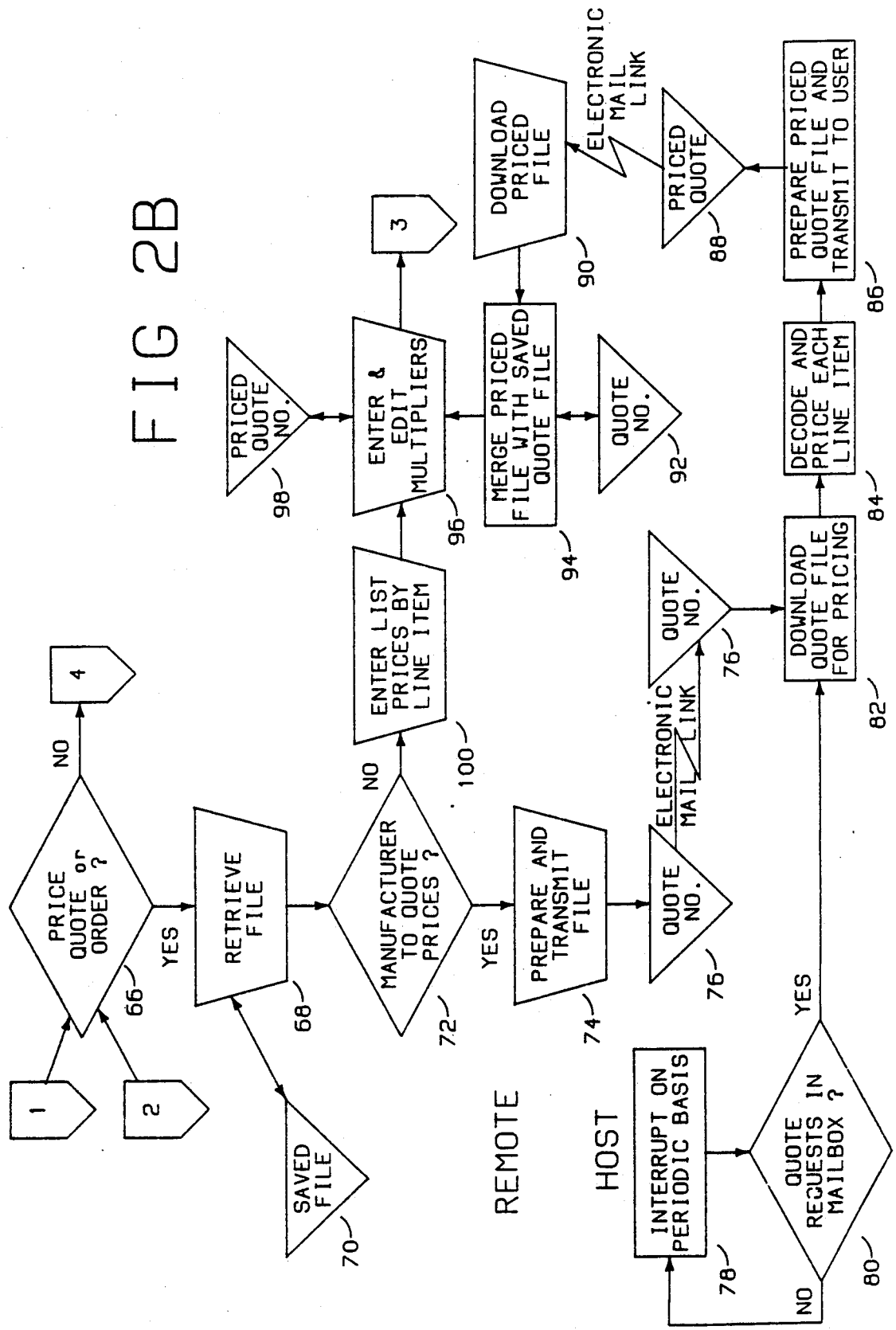

MAIN MENU

1 - BEGIN NEW JOB/QUOTE ⎫
2 - SKIP HEADER         ⎬ GOTO LINE ITEMS
3 - CREATE A SUBMITTAL
4 - PRICE/PRINT SPREADSHEET
5 - PRINT SUBMITTAL
6 - TRANSMIT FOR PRICING
7 - RECIEVE PRICING
8 - SETUP
9 - NEW JOB
0 - QUIT                  O - ORDER

U - UTILITIES

FIG 3

```
QUOTATION SYSTEM
REPRESENTATIVE NUMBER  --M99           DATE : 11/02/87

PRODUCT ID: VUBB12L4111N20C1

QUANTITY: .1

TAG:

COMMENT:

FAN RPM:

Current line: 20   Lines saved:  20   | Use [ENTER], or    to move cursor

F1--EXIT/MAIN MENU        F5--COMMON PI LIST         F10--HELP MENU
F2--EXPLODE PID           F7--48 HR STOCK LIST       PgUp--SHOW PREV LINE
F3--PID MENU -ON          F8--DELETE THIS LINE       PgDn--SHOW NEXT LINE
```

FIG 4

QUOTATION SYSTEM

REPRESENTATIVE NUMBER --M99                    DATE : 11/02/87

PRODUCT ID: VUBB12L4111N20C1      UPBLAST CENTRIFUGAL ROOF VENT

DESIGN    B SERIES          MOTOR     1 OPEN DRIP PROOF
SIZE      12                LISTING   N NON-LISTED
H.P.      L 1/4 HP          FINISH    20 MILL FINISH
RANGE     4                 WHEEL     STD
ELECT'CL  11 115V-SINGLE    SCREEN    NO SCREEN
                            CAP       C STD CURB CAP
                            OPTIONS   1 DISCONNECT

F1--EXIT W/O SAVING THIS PID      USE ... HOME or END to MOVE CURSOR
F2--SAVE THIS PID                 USE SPACEBAR TO DISPLAY OPTIONS

FIG 5

AUTOMATED SYSTEM FOR PRICING AND ORDERING CUSTOM MANUFACTURED PARTS

This is a division of application Ser. No. 07/198,196 filed May 24, 1988 now abandoned.

The present invention relates to systems for pricing and ordering goods in general, and relates, in particular, to an automated system for implementation by a manufacturer having numerous widely separated sales representatives organized so that the sales representatives can obtain pricing information, and place orders for the goods to be manufactured, on an efficient and automated basis from the manufacturer.

BACKGROUND OF THE INVENTION

In some industries, such as the business of manufacturing air distribution equipment for commercial and industrial applications, many if not most of the goods are manufactured specially in custom fashion for each particular order. Such manufacturing on a custom basis is needed, and desirable, because each of the pieces of equipment in such an industry must be made in an inordinately large number of sizes. For example, steel air duct registers may be available in any quarter inch increment of length or width size over a very large size range. The permutations of mathematically available sizes in which such registers might be ordered makes it obvious that either an enormously large inventory must be maintained or individual registers must be manufactured in particular sizes for particular jobs on a custom basis, as needed. It is this practice of the custom manufacture of air handling equipment that has become common in the industry.

One difficulty in administering and maintaining such a custom manufacturing business is the problem of constructing and pricing detailed orders for particular jobs. As in many industries, in the air distribution equipment industry, sales are actually made in the field by independent sales representatives. Such sales representatives are typically not employees of the manufacturer, but are manufacturer's representatives who may represent other complementary companies as well. It can become an extremely complex for such sales representatives to learn the process of specifying, pricing, and ordering items in a custom manufacturing industry in which there may be an overwhelmingly large number of items which can be ordered. Previously this industry has adopted a practice in which manufacturers send to each of their sales representatives a large book which has prices fixed for some period of time, i.e., a sales year, and contains in detail the part number, and size information for each part number, together with the price for each sized part. The use of such books is satisfactory for such an operation, but can lead to difficulties with regard to access to the various part numbers in question and errors introduced by the sales representative needing to gain pricing information for large numbers of parts. Since for each part there are codes for various sizes, styles and options, clerical errors become easy to occur.

Such a system has an additional level of complexity brought about by the fact that the sales representatives receive a discount off of list price, with the discount potentially varying by both the size of the order and the numbers of a particular item which are ordered. This also leads to possibilities of mistake and error in the ordering and pricing process.

The entry of orders electronically into electronic data processing apparatus for pricing and totalling sales of items is generally known in the prior art. The prior art contains examples of systems, for example, in which the number and identity of items to be sold is placed on cards which are electronically read so that total price and order information can be calculated. Such systems are usually local in their operation, however, allowing pricing and ordering information requests only to be implemented by persons in a restricted locale or requiring the actual physical transportation of media for processing to the data processing facility.

It is also generally known in the art that remote terminals can be utilized for financial transactions. There are many examples known in the prior art, such as for example, automatic teller machines, in which remote transactions are conducted by a customer with the data regarding the transmission being transmitted by electronic communication, usually over a leased or dedicated telephone line, to a remote host which receives the information, processes the request, and communicates acceptance and verification of the exchange back to the remote terminal. The majority of such systems are implemented on a basis which requires an essentially full-time communication link between the host and the remote terminals, so that immediate access to the host is always available to the terminal. In a system in which the usage at each individual remote terminal is relatively infrequent, the use of such dedicated telecommunication links suffers from a disadvantage in that the maintenance and carrying costs of such links can be out of proportion to the economic value of the communication service provided.

SUMMARY OF THE INVENTION

The present invention is summarized in that a system for the remote pricing and entry of orders for custom manufactured items includes a central data processing facility at the manufacturer connected to a telecommunication link to an electronic mail service host, a remote station for a sales representative including a personal computer and a remote telecommunications link, and an electronic mail service host having telecommunication links to both the sales representative personal computer and to the manufacturing host and organized to have electronic "mailboxes" for messages addressed to either of the sales representative or the host, the manufacturer's host including means for polling the mailbox assigned to the host on a periodic basis so that messages transmitted by the remote sales representatives are processed in an expeditious fashion.

It is an object of the present invention that a method is provided for the obtaining of pricing information and the entering of orders for custom manufactured equipment which is simple, quick and efficient in its operation, and is automated, without requiring dedicated telecommunication links to each sales representative in the field.

It is another object of the present invention to provide a method of processing pricing and ordering transactions in which sales representatives in the field deposits pricing or ordering requests with an electronic mail facility host which is periodically polled by the host computer of the manufacturer so that orders receive relatively prompt attention without requiring dedicated telecommunication links.

It is an object of the present invention to provide a system for efficiently pricing and ordering the manufacturer of air distribution equipment in a prompt and expeditious manner while lowering the probability of erroneous price quotes and incorrect errors.

Other objects, advantages, and features will become apparent from the following specification when taken in conjunction with the accompanying drawings.

BRIEF DESCRIPTION OF THE DRAWINGS

FIG. 1 is a schematic illustration of the linkage between the parts of a system constructed in accordance with the present invention.

FIGS. 2A through 2C are flow chart diagrams illustrating the method of operation of a system constructed in accordance with FIG. 1.

FIG. 3 is an illustration of a main menu of the system of FIGS. 1 and 2.

FIG. 4 is an illustration of a line item entry screen of the system of FIGS. 1 and 2.

FIG. 5 is an illustration of an exploded product ID screen of the system of FIGS. 1 and 2.

DESCRIPTION OF THE PREFERRED EMBODIMENT

Figure 2A:
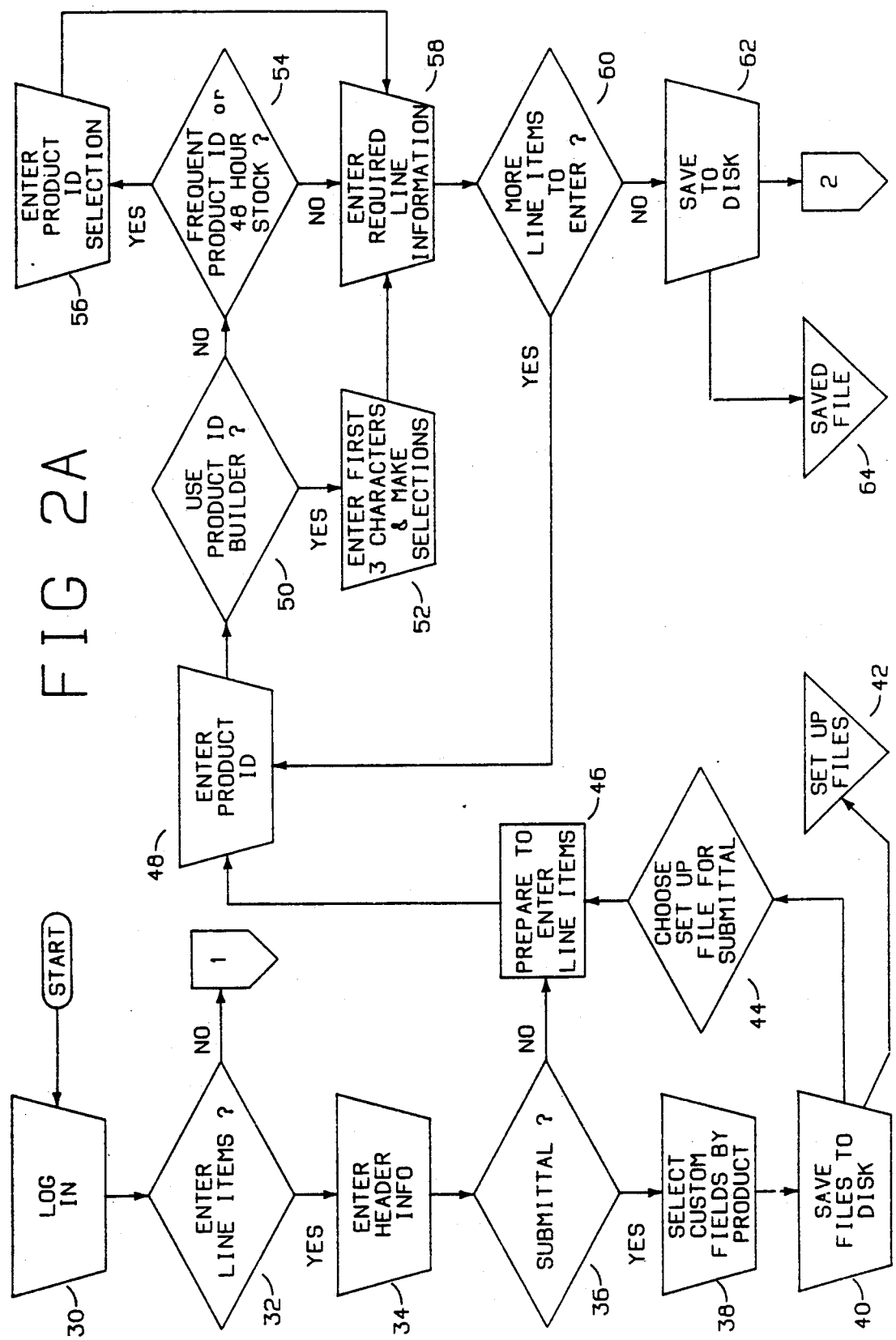

Illustrated in FIG. 1 is a schematic illustration of how the custom manufacturing pricing and order entry system in accordance with the present invention is arranged. A variety of sales representatives in the field are each equipped with a personal computer 12 having processing capabilities, local memory and long term storage such as disk drives. Those personal computers 12 may be installed at the office locations of the sales representatives or may be portable units which they may carry with them to their home or other remote locations. At any remote location in which there is a telephone, the personal computer 12 can be connected to a local telephone 14 through a data communication device, typically a modem, so that digital information can be transmitted through the local telephone lines. Through such a local telephone linkage, the local telephone 14 can call a local telephone node 16 of an electronic mail system. The electronic mail system consists of an electronic mail service host 18, which is typically a large mini or main frame computer located in a remote facility which is connected by leased or dedicated data communication lines with local telephone nodes spread throughout the United States. Such an electronic mail service will have a local node 16 at or near the location of each sales representative and will also have a local node 20 at or near the location of the manufacturer. Several competing electronic mail services, including an electronic mail service host, such as 18, and appropriate local nodes spread throughout the country, are available. One such service is the EASYLINK (TM) service offered by Western Union. Some systems may use a digital interconnect carrier, such as TYMNET or TELENET, to communicate with the various nodes around the service area. From the local telephone node 20, the data communication link extends over local telephone lines to a telephone access 22 connected to the manufacturer's host computer 24.

In an electronic mail system, such as that implemented by the electronic mail service host 18, communication need not be instantaneous between remote devices which have access to the electronic mail host 18. Typically the overhead software and procedures are implemented in an electronic mail service system assign a series of address location, or "mailboxes," which have an address or access code associated with each of the users of the electronic mail system. Thus each sales representative having a personal computer 12 will have assigned to it one or more mailboxes in the system of the mail service host 18 and the manufacturer host computer 24 also has assigned to it one or more mailboxes within the electronic mail service host 18. A preferred method of implementation is for the manufacturer host to have assigned to it at least two electronic mailboxes, one assigned to receive requests for quotations and one assigned to receive orders. During any given access to the electronic mail service, any remote device associated with it, such as one of the personal computers 12, or the manufacturer host computer 24, can either deposit files onto the electronic mail service host 18, to be stored in the mailbox of the addressee, or can read items out of its own mailbox to "download" them into the computer which is accessing the electronic mail service host 18.

Thus it is envisioned within the system of the present invention that, in the procedure described in more detail below, the sales representatives utilize their personal computers 12 to construct quotations or orders of items and part numbers or product IDs. Those listings of items and product IDs are deposited by the sales representative's personal computer 12 onto the electronic mail service host 18 by use of the linkage provided by the telephone access provided by telephone nodes 14 and 16. The data file, i.e. quotation or order, consisting of the items and product IDs are stored by the electronic mail service host 18 in a mailbox associated with the manufacturer host computer. Periodically on a fixed time period basis, such as once every twenty minutes, the manufacturer host computer 24 accesses the mail service host 18 through its telephone connections 20 and 22 to interrogate its mailbox to determine if any messages have been left for it. The manufacturer host computer 24 then downloads the file containing the items and product IDs together with information identifying the sales representative who has submitted the request. The host computer 24 can then calculate out pricing information based on the items and product IDs. The resulting information in the form of a priced quote is then uploaded from the manufacturer host computer 24 through the telephone linkage 20 and 22 into the electronic mail service host 18, where it is stored in the mailbox designated for the particular sales representative who had previously placed the pricing order request. Thus, if the sales representative again uses his personal computer 12 to examine the contents of his mailbox after some reasonable wait after he has deposited his request for pricing, such as for example, an hour later, the sales representative will receive a priced quote file which can be downloaded from the electronic mail host 18 onto his personal computer 12 in such a way that the file contains not only the items and product IDs which the sales representative entered into the system, but now also contains complete pricing, and discount information as supplied directly from the manufacturer. In this way, the sales representative can prepare and implement pricing quotations and proposals in a much more accurate and efficient manner, and with a much closer linkage to the actual pricing and parts information supplied directly from the manufacturer.

Figure 2C:
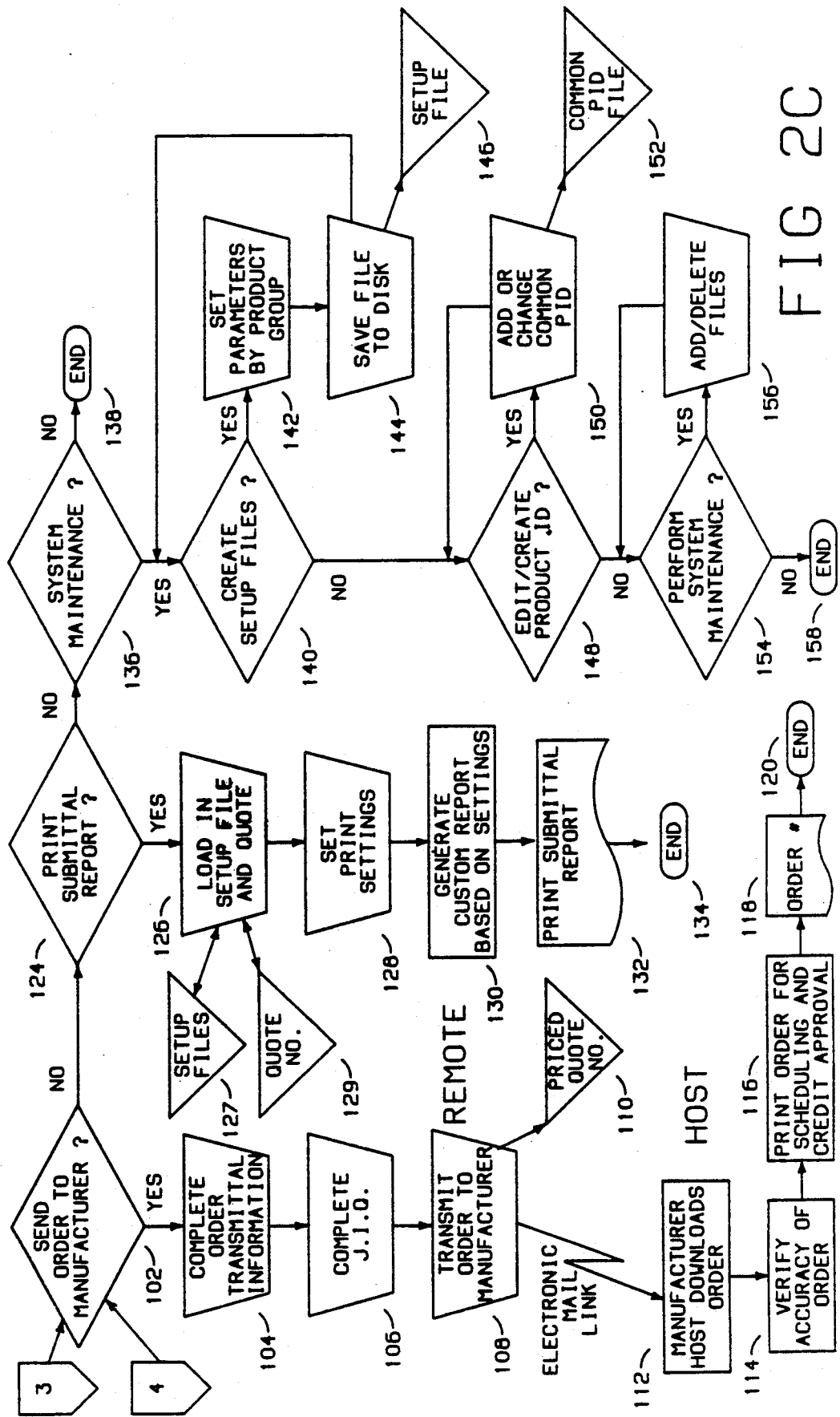

Illustrated in FIGS. 2A through 2C, together with FIGS. 3-5, is an illustrative schematic flow chart of the manner of operating the computer program or software in the sales representative personal computer 12 and the manufacturer host computer 24 necessary to implement the system as described in general above. The system is designed to allow flexibility to the sales representative either to do local pricing, using traditional printed reference materials, or to do automated pricing by submitting pricing requests to the manufacturer through the electronic mail service. The system is also capable of not just requesting pricing information, but also actually placing orders with the manufacturer for the construction and shipment of custom goods to addresses as indicated by the sales representative.

Illustated beginning in FIG. 2A is the flow diagram for the operation of the computer software operating in a method in accordance with the present invention. The software begins, at step 30 with a log-in procedure in which a user, i.e. a sales representative, is interrogated as to his password to ensure that he has proper authority to access the system. Such system log-ins are well known to the prior art. The next step, illustrated at step number 32, is a decision step to ascertain whether the user desires to enter line items i.e. to define items of goods to be priced or ordered. This decision step 32, is implemented by the user accessing or choosing items from a menu. Illustrated in FIG. 3 is a sample of such a menu which can be used as the main menu for a system implemented in accordance with the present invention. The menu as illustrated in FIG. 3 gives the user the ability to begin new jobs or orders, to create a submittal, to expand items to a price/print spread sheet, to print a submittal, to transmit an item for pricing, or to receive pricing. The menu also allows the user to set up new jobs, to quit, to order the manufacture and shipment of goods, or to select utilities which may be utilized to update his local software. Note that several of the selections on the menu lead the user into the preparation and editing of particular line items. Those selections would be represented in the flow chart of FIG. 2A as a yes to the question presented at step 32. If the user does not choose to enter line items, the flow chart branches to FIG. 2B. If the user does desire to enter line items, such as for example selecting one of the first three selections from the main menu illustrated in FIG. 3, the program then proceeds to program step 34 where the user is asked to enter appropriate header information for the quote or order. This information can be simply requested by screen prompts which require information to be entered about the identity and name of the ultimate customer, and any job numbers or quotation numbers associated with the quotation or order being prepared. The header information may also include a note pad area for the user to write down notes about the job and to enter the effective pricing date requested. This is a free form location in which miscellaneous information not elsewhere appropriate can be entered for later transmission to the manufacturer.

The next item on the flow chart of FIG. 2A is a decision step inquiring whether or not what is to be prepared is a submittal, and this step is illustrated at 36 in FIG. 2A. A submittal is a document not for use for communication between the sales representative and the manufacturer, but is a document intended for submission to the ultimate customer, i.e., in the business of air distribution equipment, to the engineer or construction company which will be using the products. Therefore, while the system for communicating part identification and ordering information between the manufacturer and the sales representative is within the control of the manufacturer, the system must also have the ability to print submittals in a wide variety of styles and formats as might be required by particular customers. Thus, if a submittal is to be prepared, the system then allows the sales representative to select and prepare custom fields by product type and to generally have editorial control over the style of format and appearance of the submittal form. This process is reflected by step number 38. Because many sales representatives will deal repetitively with the same customers, and because the creation of a submittal form for a particular customer may require a significant amount of time and effort, the system then allows, at program step 40, for the sales representative to save a file on disk storage with the file consisting of a set up file containing information on the custom fields necessary for a submittal document prepared in accordance with the wishes of the particular customer. The file saved on disk is represented at 42 in FIG. 2A. In any event, the user then proceeds to a decision step 44 in which the user chooses the set up file to be used for the particular submittal to be prepared. This set up file may be one which is custom prepared at step 38 or may be one which is retrieved from the set up files 42 at step 40. In any event, this submittal form is saved with the line items entered subsequently for use in preparing the ultimate submittal to be prepared for the customer for the goods. Thus, regardless of whether a submittal is to be prepared or not, ultimately the user proceeds through the system to prepare to enter line items as indicated by the program step 46.

Illustrated in FIG. 4 is the line item entry screen presented on the personal computer of the user for the entry of line items representing individual items to be manufactured for the particular quotation or order being created by the sales representative. The line item entry screen has as its first line the entry of the product identification code or product ID. This is represented at program step 48 in FIG. 2A. Note, as illustrated in FIG. 4, that the product identification code is a lengthy alpha-numeric character string. In a business such as the manufacture of equipment for air distribution, and other industries in which a large number of custom sized fabricated parts are to be constructed on a custom basis, an extremely large product ID is useful to encode sufficient specifications about the particular part, style, color, finish, and, in particular, size. Therefore the product identification may typically have a large number of digits, varying from twelve to as many as twenty which may be numeric or alpha-numeric in character. This product identification code thus contains more information than just the style of product but contains imbedded codes indicating the actual size and finish of the goods to be manufactured. It is the complexity of these product identification codes and their proper usage and implementation that makes an automated system constructed in accordance with the present invention particularly useful for avoiding clerical errors in the entry and pricing of products specified in this manner.

The next step in the program, as illustrated in FIG. 2A, is represented as a decision step 50 asking whether the user desires to use the product ID builder. The product identification code builder is represented by an option, available by function key as illustrated in the line item entry screen of FIG. 4. Note that function key F2 is labeled "explode PID." Using the product ID builder, by pressing function key F2 from the line item entry screen of FIG. 4, makes available to the user the exploded product identification screen illustrated in FIG. 5 which is the product ID builder. This screen provides an input for the product identification code so that the software may refer to tables contained in the software to determine from that product identification what the size, kind and nature of the goods are. Thus the screen has a series of parameters, illustrated in FIG. 5 with reference to a roof vent, appropriate for the kind of goods indicated by the product ID. All of the selections contained in the various parameters listed in the screen of FIG. 5 are all contained within information embedded in the product identification code, or product ID, shown at the upper left corner of that screen. The screen embodies the method by which the user accesses all the information which is embedded in that code so that the sales representative can be sure that all of the appropriate options which are desired for a particular item are properly requested by properly encoding the product ID. This is illustrated at program step 52 in FIG. 2A.

In the detailed operation of the product identifciation code builder as illustrated by FIG. 5, the user first enters the first three characters of the product ID in the upper left hand corner of the screen of FIG. 5. The computer program operating in the personal computer 12 of the sales representative code with a representative product ID code and then fills out the remainder of the screen with the product specifications for the item represented by the representative product ID code. Thus the representative product ID code functions as a default product ID which is completed by the software. The sales representative can then proceed through the various option items on the screen, by moving the cursor around the screen, and make changes to the displayed product specifications for the default product displayed. For example, if the sales representative desires to change the size, indicated as "12" in the example of FIG. 5 to, for example, "14," the sales representative moves the cursor down to the line indicated by size and replaces the number "12" with the number "14." The system software then automatically updates the completed default product identification code by changing the embedded code 12 to 14, indicating the size within the product identification code itself. Thus the sales representative can move through the options available on the exploded screen of FIG. 5 and change the product specification or option items while the system automatically updates the code of the product ID to include the changes so that the user does not have to learn each of the codes for the specifications of each product which is available. It is this process of selecting option items which are updated into the product identification code which is represented by program step 52 in FIG. 2A in which the first three code characters are entered and then the various item selections for specifications and options are made. When the sales representative has completed selection of all his options in the screen in FIG. 5, the sales representative may choose function key F2 to save this product identification code and return to the product ID selection screen of FIG. 4 for a new line item entry and to indicate to the software that the updated product identification code is complete.

If the product ID builder is not used, the program branches to decision step 54 which asks if the desired item is a frequent product ID or requested from forty-eight hour stock. If it is a frequent product ID with which the sales representative is familiar, the sales representative need not call the PID menu as shown by FIG. 5, but can enter product ID selections directly as indicated by step 56 in FIG. 2A. Similarly, a manufacturer may maintain a list of standard items available on forty-eight hour stock, which have product ID selections listed for them so that the sales representative can merely refer to that list to gain the appropriate product ID code for selection. In any event, regardless of the manner in which the product ID is constructed, the product ID is then used at step 58 in conjunction with the other required information, such as quantity, to create a line item to include in the job for quotation or ordering. As shown in FIG. 2A, the program then proceeds to step 60 which is a decision step requesting whether there are more line items to enter. If there are more line items to enter, then the program returns to step 48 where the user can again either request the product ID builder or can enter product IDs directly. If the user has completed a particular job with no more line items to enter, the program proceeds to step 62 in which the program saves to disk a file, indicated at 64, which now contains a job number plus a list of items and associated product ID codes representing a total job to be either priced or ordered on behalf of a particular customer. In the continuing flow chart illustrating the operation of the present system, continued in FIG. 2B, the next step is a decision step indicated at 66 which asks whether it is desired to price the quote or order. If a pricing step is not to be performed, the program proceeds to the steps illustrated in FIG. 2C. If a pricing procedure is to be performed, the program then proceeds to program step 68 in which the file containing the list of items to be priced is retrieved. The saved file which is retrieved is indicated at 70. This saved file can either be the same save file which was just saved to disk at step 64 in FIG. 2A, or can be any other saved file currently carried on the system. The next decision step in the flow chart is indicated at program step 72 and represents alternative methods for quoting prices for the items in the job. The sales representative at the remote location with his personal computer can either manually quote the item prices himself or can transmit the quote to the manufacturer for pricing. Assuming that the sales representative desires to transmit the quote to the manufacturer for pricing, he proceeds to program step 74 in which the quote file is prepared for transmission and to program step 76 in which the actual quote file, referenced by quote number, is transmitted to the manufacturer. This file, referred to by quote number, includes the quantity and product identification code for each item in the job. As illustrated schematically in FIG. 2B, the quote is transmitted by electronic mail linkage from the remote location, or the personal computer of the sales representative, through the electronic mail system linkage to the manufacturer host computer. This linkage is the one illustrated in FIG. 1.

The manufacturer host computer, 24 in FIG. 1, is available for other processing on an on-going basis. Periodically it has an interrupt, indicated by program step 78 in FIG. 2B. This interrupt is connected to initiate a procedure of inquiry into the electronic mail system on a periodic basis. The period should be such so that the host system is reasonably responsive to inquiries from sales representatives. Such a periodic basis might be once every fifteen or twenty minutes. When such an inquiry is made, the program then proceeds to program step 80 in which it is inquired if there are any quote requests in the mailbox for the manufacturer host. Imbedded in the step is the concept that the host would automatically have telecommunication parameters built into it so that it could dial the access number of the local node of the electronic mail service system, and be connected therethrough to the electronic mail service host, and thereafter present to the electronic mail service host the appropriate mailbox address which has been assigned to the manufacturer. Such parameters can be built into the telecommunication software embedded in step 80 so that the system automatically polls the electronic mail system and looks for communications placed in its mailbox. If such communication is in its mailbox, then the program proceeds to download the same quote number 76, which has been transmitted over the electronic mail system, through a download step indicated at 82 into the manufacturer host computer. The manufacturer host can then decode each item on the quote and price each line item, as indicated at program step 84. That manufacturer's host then reassembles the file as a priced quote for transmittal to the user and transmits it to the user at program step 86 as a priced quote indicated at 88. Again the quote is transmitted into the electronic mail service system, this time addressed to the mailbox associated with the personal computer of the sales representative who transmitted the request for quote.

At the remote location, the sales representative uses his personal computer to download the priced file at program step 90. Under normal operation, the sales representative would not have to be in personal communication with the manufacturer to know that a file is available for downloading. The sales representative would merely up load the quote request into the electronic mail system and then return at some reasonable later time, as for example an hour later, and poll his electronic mail mailbox for the priced quote. Since the host system is monitoring and responding on a periodic basis, typically something like twenty minutes, unless there has been a defect or problem with the system, after such a reasonable wait the sales representative will find his priced quote in his electronic mail mailbox ready for downloading at program step 90. The software of the remote location then merges the priced quote file with the saved quote file indicated at 92 at program step 94. The program then proceeds to enter and edit the appropriate multipliers for the sales representative at program step 96. This procedure creates a completed priced quote, stored by number, which is stored to disk as indicated at 98. At step number 72, if it was decided that the manufacturer was not to quote the prices, then the sales representative need to refer to the manuals and other printed reference material to determine the prices for each line item and then the sales representative, at program step 100 would then manually enter the list prices by line item into the system. From step 100 the program would again proceed to step 96 to enter multipliers and commissions to complete the fabrication of the price quote number. The program then proceeds to the steps illustrated on FIGS. 2C.

On FIG. 2C, the first step illustrated is a decision step 102 as to whether the user desires to send an order to the manufacturer. The program reaches step 102 either from step 96 in FIG. 2B or from step 66 in FIG. 2B. If the user does desire to send an order to the manufacturer, the program branches to step 104 in which complete order transmittal information is obtained from the user. The order transmittal information required includes invoice name and address, an order number, a customer order number, a ship to address and other information such as shipping date, telephone numbers for inquiries and special shipping instructions. Before the order is transmitted the program proceeds to program step 106 in which job information questionaire (JIQ) entry information is requested from the user. This information includes information about the project for which the materials are being ordered, such as the project name, address, the name and address of the general and subcontractors, name and address of bonding agencies and name and address of the project owner. Because such JIQ information is required by the manufacturer to properly fill such an order, the program will refuse to advance to order transmittal until the requested JIQ information is supplied.

Once the appropriate information has been assembled, at program step 108 the priced quote is retrieved from disk, indicated at 110 and is transmitted to the manufacturer as an order with the completed order transmittal and JIQ information via the electronic mail link.

At the manufacturer, the manufacturer host computer, during its periodic polling of requests and other items placed in its mailbox, senses that an order has been placed in its electronic mailbox and downloads the order at program step 112. Then the manufacturer host proceeds to verify the accuracy of the order at program step 114 and, assuming that it is accurate, prints the order for scheduling and credit approval at 116 resulting in an order number 118 in hard copy. A copy of the hard copy printout from step 118 is sent to the sales representative to confirm receipt and processing of the order. This is the end, indicated at 120, of the ordering process. The goods are then manufactured and shipped in accordance with the order instructions. Order confirmation can be retransmitted back to the sales representative, as desired, again using the electronic mail linkage.

Another option available within the system available to the sales representative on his personal computer 12 is to print what is called a submittal report. This option is indicated by the branch step indicated at program step 124 in FIG. 2C. A submittal report is a form for submission to the customer in the customer's own desired format and style that is, in essence, a bid on a particular job or project. If a submittal report is to be prepared, the program proceeds to program step 126 in which a set up file and a quote are loaded in and assembled. The set up file, indicated at 128 is the same type set up file referred to at 42 in FIG. 2A which consists of the print parameters and formatting parameters for a submission report in the style desired by a particular customer. The quote number, indicated at 130 has a price quote previously saved disk. Once the quote has been processed in the style and fashion desired and appropriate for the set up file, the system then proceeds to program step 128 in which the print settings are established and then to program step 130 in which the custom report based on the print settings in the set up file is printed thereby producing a printed submittal report 132. This is the report which can then be sent to the customer. As indicated at 134 this is the end of this routine.

The last option available on the system is maintenance of the parameters for the system maintained at the personal computer 12. This is indicated by system maintenance request indicated at program step 136. If no system maintenance is to be performed, the program ends at 138.

The first option available if system maintenance is to be performed is to create set up files indicated by program step 140. These are the files used to set parameters for printing and formatting of the submittal reports to be prepared for particular customers. If this routine is to be implemented, the program then proceeds to step 142 in which the user sets parameters by product group and identifies the type and format of the documents to be prepared. Once the set up parameters are determined, at program step 144 these parameters are saved to disk to create a set up file 146.

Another system maintenance option available is to edit and create product IDs indicated at program step 148. If this option is to be utilized the program then proceeds to a program step 150 in which common product IDs, or PIDs, are added, changed or edited as appropriate and the results are stored in a common PID file indicated at 152.

There is also an option, indicated at program step 154 to perform general system maintenance which includes, as indicated at program step 156 with adding or deleting file on the system. At the end of the performance of system maintenance, the program ends at 158.

Thus, in the system of the present invention, a system and a method for utilizing it is enabled for the accurate pricing of custom manufactured goods of a complex and detailed nature. The system is made accurate and efficient by providing an electronic mail linkage between the remote sales representative and the manufacturer. The sales representative prepares his quote by entering the various line items and identifying the part numbers and then assembles the quote and transmits it to the electronic mailbox associated with the manufacturer. The manufacturer's host computer periodically polls the electronic mailbox assigned to it to look for requests for quotations or orders. If a request for quote is there, the host downloads the request, prices it, and transmits it back to the electronic mailbox associated with the requester. If an order is present, it is received and processed. Since this is done on a periodic basis, the sales representative who has requested a quote knows, with some reliability, that he can return and download his priced quote after a predetermined wait period. Since the sales representative is utilizing the manufacturers system for the pricing, he runs less risk of making erroneous pricing decisions by making clerical errors in referring to printed reference materials. In addition, since the actual order can be transmitted electronically through the same electronic mail linkage, the transmittal and processing of orders proceeds much more expeditiously and orders are received by the manufacturer within the hour of transmittal from the sales representative in the field.

It is to be understood that the present invention is not limited to the particular construction and arrangement of parts illustrated herein, but embraces all such modified forms thereof as come within the scope of the following claims.

We claim:

1. A method utilizing a computer with memory means and display means to prepare product identification codes for custom manufactured parts for which information and specification, including physical description, for the parts are encoded in the product identification, the method comprising the steps of
   (a) displaying a product ID display to a user on the display means, the product ID display including a location for the product identification code and a plurality of display locations for product specifications which are encoded by the product identification code;
   (b) receiving from the user a plurality of characters representing the beginning of a product identification code;
   (c) displaying on the display means a completed default product identification code including the received characters and also displaying the product specifications, including physical description, for the completed default product identification code;
   (d) receiving from the user changes to the product specifications displayed for the completed default product identification code;
   (e) the computer changing the completed default product identification to an updated product identification code to incorporate any changes to the product specifications received from the user by incorporation of those changes into the displayed product identification code; and
   (f) receiving from the user an indication that the updated product identification code is complete so that a complete product identification code for the desired product specifications is created without the user needing to understand the manner of encoding of the product specifications in the product identification code.

2. A method as claimed in claim 1 wherein the displaying of step (a) is a video display on a CRT screen of a personal computer.

3. A method as claimed in claim 1 wherein the receiving of step (b) includes receiving the first three characters of the product identification code.

4. A method as claimed in claim 3 wherein the displaying of step (c) includes displaying at the location on the product ID display a completed default product identification code corresponding to a standard part specified by the first three characters received.

5. A method as claimed in claim 1 wherein the receiving of step (d) is accomplished by the user replacing default product specifications on the display means with the desired specifications.

6. A method as claimed in claim 1 wherein the custom manufactured parts are parts for air distribution equipment.

7. A method for pricing custom manufactured parts utilizing a remote personal computer operated by a sales representative, a manufacturer host computer operated by a manufacturer and an electronic mail system in which messages can be left in electronic mailboxes assigned to particular users, the method comprising the steps of:
   (a) preparing on the personal computer of the sales representative a quotation including a list of items by product identification code, the product identification code for each item including imbedded information as to the physical specifications of the item to be manufactured, the product identification code for each item being developed through a method comprising the steps of
   (1) displaying for theサales representative on the personal computer a product ID display including a location for the product identification code and a plurality of product specifications which may be encoded by the product identification code,
   (2) receiving from the sales representative a plurality of characters representing the beginning of a product identification code, (3) displaying on the personal computer a completed default product identification code including the received characters and also displaying the product specifications for the completed default product identification code, (4) receiving from the sales representative changes to the product specifications displayed for the default product identification code, (5) the personal computer changing the product identification code displayed to the sales representative to match the changes received to the product specifications, and (6) receiving from sales representative an indication that the updated product identification code is complete;

(b) transmitting the quotation including the list of items by product identification codes into the electronic mail system addressed to the mailbox of the manufacturer;

(c) periodically polling the mailbox of the manufacturer by the manufacturer host computer;

(d) downloading the quotation from the mailbox of the manufacturer into the manufacturer host computer;

(e) in the manufacturer host computer, pricing each item in the quotation;

(f) transmitting the quotation with the pricing for each item from the manufacturer host computer into the electronic mail system addressed to the mailbox of the sales representative; and (g) downloading into the personal computer of the sales representative the quotation with the pricing for each item.

* * * * *